United States Patent [19]

Shoenfeld

[11] Patent Number: 5,345,736
[45] Date of Patent: Sep. 13, 1994

[54] CARPET SYSTEM FOR UTILITY TRENCH AND METHOD

[76] Inventor: W. Marvin Shoenfeld, 424 Down Hill Dr., Ballwin, Mo. 63021

[21] Appl. No.: 918,243

[22] Filed: Jul. 23, 1992

[51] Int. Cl.$^5$ .................. E04B 5/48; H02G 3/08
[52] U.S. Cl. .................. 52/220.5; 52/220.1; 52/126.2; 174/48
[58] Field of Search .......... 52/220.4, 220.5, 220.6, 52/220.1, 126.2, 222, DIG. 1; 174/48, 49, 50, 65 R

[56] References Cited

U.S. PATENT DOCUMENTS

| | | | |
|---|---|---|---|
| 3,566,566 | 3/1971 | Janic | 52/220.5 |
| 3,603,048 | 9/1971 | Hadfield | 52/220.1 |
| 3,715,844 | 2/1973 | Breading | 52/220.5 |
| 4,517,777 | 5/1985 | Calhoun | 174/49 |
| 4,612,746 | 9/1986 | Higgins | 174/49 |
| 4,638,115 | 1/1987 | Benscoter | 174/48 |
| 4,864,078 | 9/1989 | Bowman | 174/48 |
| 4,899,506 | 2/1990 | Chapman et al. | 174/48 |

FOREIGN PATENT DOCUMENTS 2015268  9/1979  United Kingdom ............ 174/48

Primary Examiner—Carl D. Friedman
Assistant Examiner—Winnie Yip
Attorney, Agent, or Firm—Polster, Lieder, Woodruff & Lucchesi

[57] ABSTRACT

A system and method for carpeting trench headers, including a cover plate having a support flange on the bottom of one lateral edge with a notch therein and an aligned notch in the other lateral edge, a "L" bracket on the longitudinal edges and the lateral edge where the flange is located, carpet on the cover within the "L" brackets, and a tool adapted to the inserted through the slots of adjacent covers to engage the bottom of one cover and lift the cover without disturbing the carpet.

9 Claims, 2 Drawing Sheets

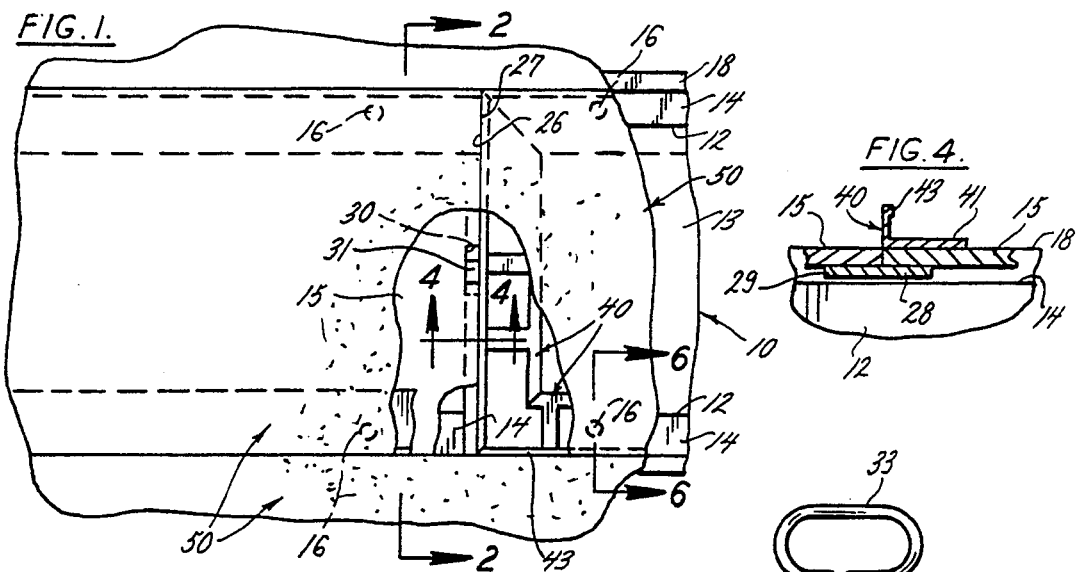
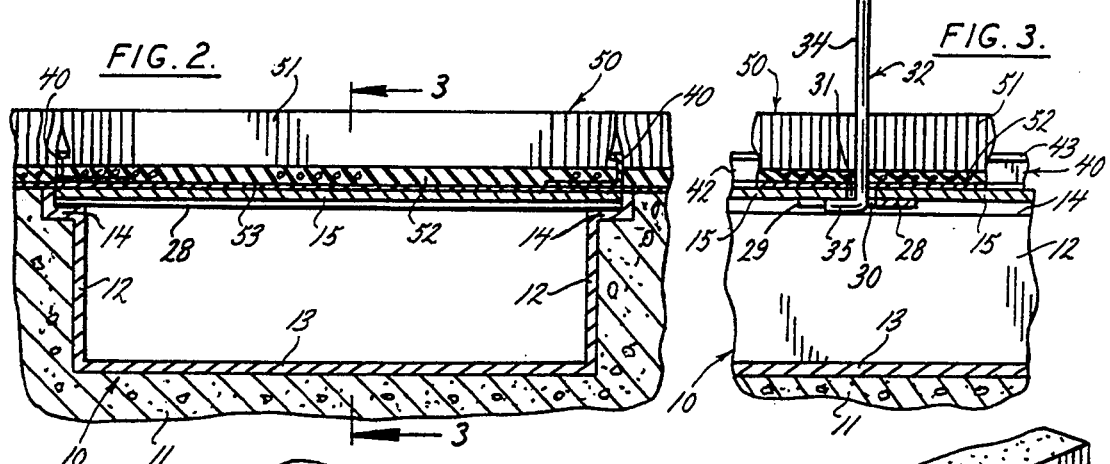
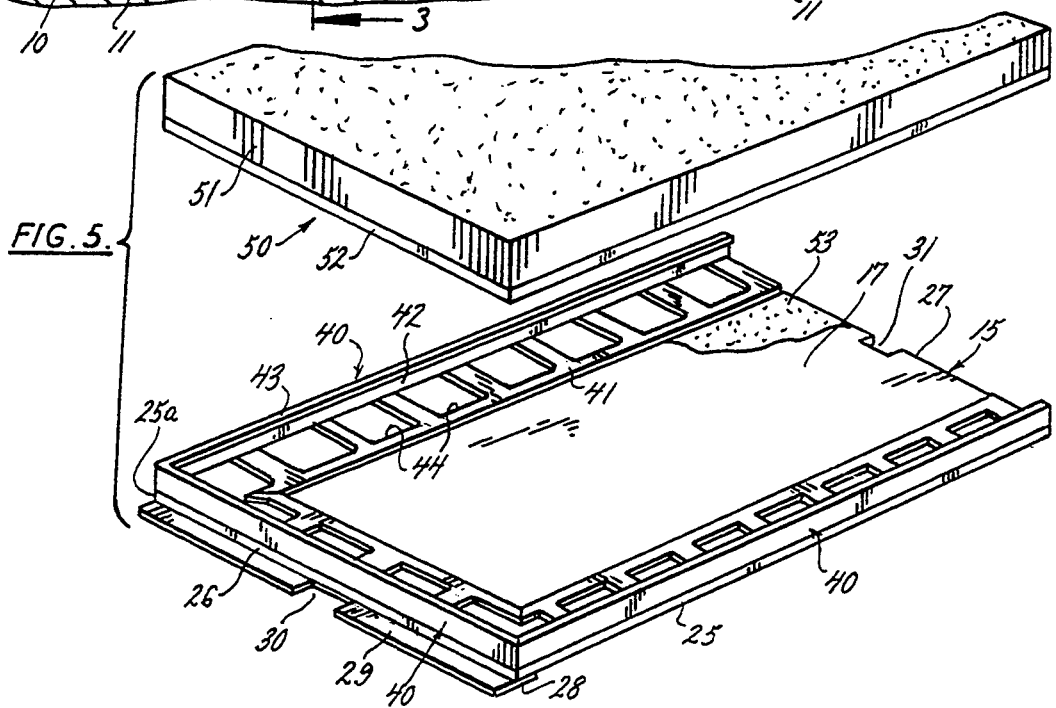

CARPET SYSTEM FOR UTILITY TRENCH AND METHOD

BACKGROUND OF THE INVENTION

This invention relates to a method of covering utility trenches and in particular, relates to the commercial installation of carpet over a floor which is provided with utility trenches to which access is had for repair or replacement of utility lines. Conventionally, the carpet over such trenches is cut so a flap can be raised to provide access to the trench cover. Because workmen may be careless, this often results in damage to the carpet over the trench and requires frequent replacement of the carpet with attendant costs and mismatches in carpet appearance.

It is a principal object of the present invention to provide a method of carpet installation over utility trenches that results in easy access to the trench and eliminates damage to the carpet over the trench. These and other objects and advantages will become apparent hereinafter.

DESCRIPTION OF THE DRAWINGS

In the drawings wherein like numbers refer to like parts wherever they occur:

FIG. 1 is a fragmentary plan view partly broken away and partly in section of an installation of this invention;

FIG. 2 is a vertical sectional view taken along line 2—2 of FIG. 1;

FIG. 3 is a fragmentary sectional view taken along line 3—3 of FIG. 2;

FIG. 4 is a fragmentary sectional view taken along line 4—4 of FIG. 1;

FIG. 5 is an exploded perspective view of a carpet and trench cover plate;

DETAILED DESCRIPTION

Figure 6:
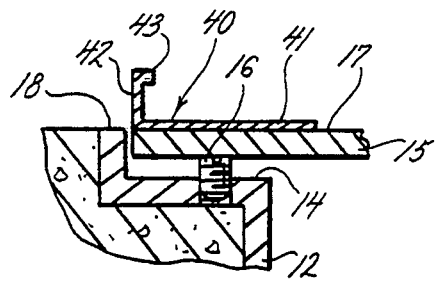
FIG. 6 is a fragmentary sectional view taken along line 6—6 of FIG. 1.

The present invention as shown in FIGS. 1 and 2 involves a utility trench 10 positioned in a poured floor 11 usually of a commercial building. The trench 10 includes side walls 12, a bottom 13, and shoulders 14 on which a trench header 15 sits. The trench header or cover plate 15 is positioned on the trench shoulder 14 by means of leveling screws 16 (FIG. 6). The leveling screws 16 are adjusted to place the top surface 17 of the trench header 15 level with the top edge 18 of the trench 10.

The header 15 comprises a main body portion which is rectangular in shape and includes the top surface 17, longitudinal side edge 25, 25a and lateral edges 26 and 27 (FIG. 5). Positioned laterally across the header 15 along the lateral edge 26 is a lateral support flange 28 which is secured to the underside of the header 15 and has a portion 29 which extends outwardly from the header 15 at the lateral edge 26 to support the center of the next adjacent plate.

When the header 15 is in place on a trench 10, the next adjacent header 15 rests on the protruding portion 29 of the flange 28. This can be seen in FIG. 1. A notch 30 is formed in the protruding portion 29 of the flange 28. The notch 30 preferably is about two inches in length and extends back to the lateral edge 26.

A notch 31 is positioned in the opposite lateral edge 27. The notch 31 is laterally aligned with the notch 30 but slightly smaller, preferably about one inch in width and about 5/16 inch in depth. Thus, when plates 15 are laid end-to-end, the notches 30 and 31 overlap and provide a passage through the header 15 into the interior of the trench 10. As will be discussed more fully hereinafter, the aligned notches 30 and 31 also provide access for a key 32 which is used to remove and replace the header 15 from the trench 10.

An "L" shaped bracket 40 is placed on three edges of the header top 17. The bracket 40 is placed along the two side edges 25, 25a and also along the lateral edge 26 which has the stiffening bar 28 and the bar notch 31. The "L" shaped brackets 40 have a base 41 which is secured to the header top 17, an upright member 42 which is generally aligned with the edges 25, 25a and 26, and an inturned stiffening rim 43. The base 41 has relieved areas 44. The brackets 40 are attached to the header top 17 by any suitable means, but preferably using construction adhesive.

Carpet 50 having a pile 51 and a backing 52 is cut to fit snuggly, but flat, within the metal bracket 40. The carpet 50 is glued to the cover top 17 using a permanent cement 53 and is not notched. The plate 17 and carpet 50 rest freely on the leveling screws 16.

The inturned lip 43 of the bracket 40 is below the top surface of the carpet pile and is substantially within the carpet pile 51 so that the trench area presents a finished appearance similar to the overall carpeted area. Any portion of the lip 43 which is visible adds to the appearance of a planned area and not the appearance of a poor carpeting job.

To remove a plate 15 to gain access to the trench 10, the key 32 is used. The key 32 is in the nature of an Allen wrench and has a handle 33, a shank 34, and an outturned tang or engaging end 35. To engage the key 32, the tang 35 is slipped through the slots 30 and 31 and then rotated to engage the undersurface of a plate 15. The key 32 then is pulled upwardly to lift a plate 15 off of the edge 29 on which it is resting. The process is reversed to reinstall the plate 15 on the trench 10.

Figure 7:
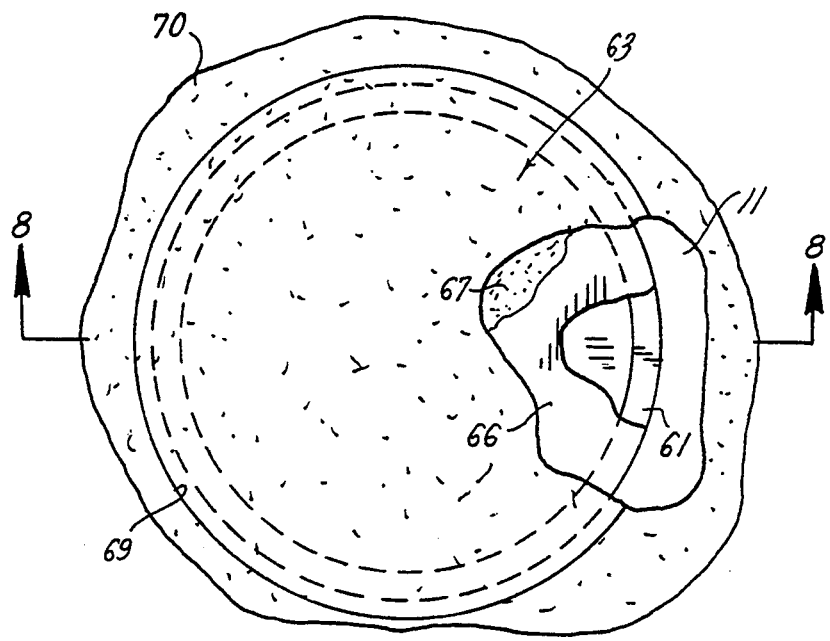
FIG. 7 is a fragmentary plan view of a modification of the invention.
Figure 8:
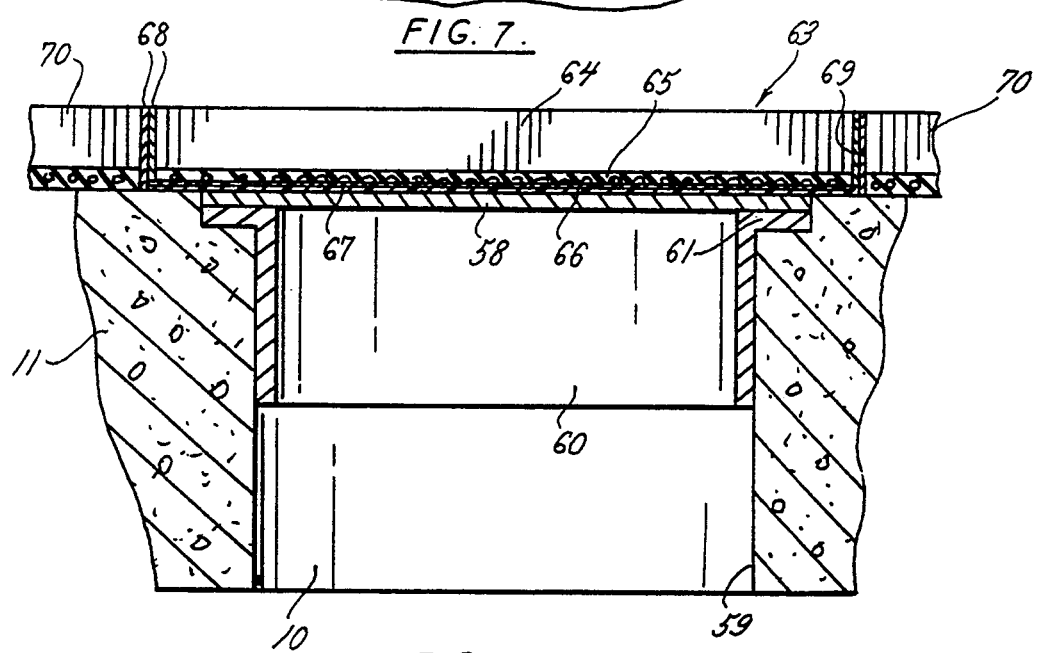
FIG. 8 is a sectional view taken along line 8—8 of FIG. 7.

A modification of the invention is shown in FIGS. 7-8 in which round plates 58 are installed over round openings 59 which open into the trench 10 formed in the floor 11. A through bored bushing 60 is placed in the opening 59 during installation of the floor and trench. The round plate 58 is positioned on to a flat shoulder 61 on the bushing 60 without using screws or other fastening or leveling means.

The top of the plate 58 is covered with a round carpet piece 63 which has a pile 64, a backing 65 and a plastic stiffener 66. The stiffener 66 is permanently secured with a suitable cement 67 to the carpet 63 and is lifted from the top of the plate 58 to gain access to the plate 58. An enlarged opening 69 is cut in the carpet 50 about 2" larger in diameter than the floor opening 59. The carpet piece 63 and stiffener 66 are cut to fit the carpet opening 69. They lay freely on top of the plate 58 and the plate 58 in turn lies freely on top of the bushing 60. The backing 65 can be shaved off to accomodate the width of the stiffener 66 to allow the carpet piece 63 to be level with the remaining carpet 70.

The circumferential edge of the carpet piece 63 is sealed with a non-adhering sealing adhesive 68 (FIG. 8).

The internal edge of the opening 69 formed in the carpet 70 which covers the remainder of the floor 11, also is sealed with a non-adhering sealing adhesive 68. This allows the carpet piece 63 to be removed from the top of the plate 58 without sticking to the remainder of the carpet 70 and damaging either piece of carpet.

The stiffener 66 gives the round carpet piece 63 some rigidity and helps it to maintain its integrity during removal and application to the plate 58.

This invention is intended to cover all changes and modifications of the example of the invention herein chosen for purposes of the disclosure which do not constitute departures from the spirit and scope of the invention.

What is claimed is:

1. A utility trench and carpet cover system in which the carpet covering the trench is not set out from the remaining carpet and in which the trench can be accessed without damage to the carpet comprising
   a. a floor,
   b. a utility trench having an open top formed in the floor and having recessed shoulders adjacent to the top of said trench,
   c. at least one trench cover plate positioning on said shoulders to cover the trench, the cover plate having a support flange positioned on one lateral edge with a portion of the flange secured to the underside of the plate and a portion extending outwardly from said plate for supporting the center of the next adjacent plate, a notch in the flange intermediate its ends and a longitudinally aligned notch in the opposite lateral edge of the cover plate whereby when cover plates are laid end to end the notches coincide,
   d. bracket means around three edges of said cover plate, and
   e. a carpet segment secured to the plate within said bracket means,
   f. whereby a tool is insertable into said alignment notches for lifting the plate off of the trench without damaging the carpet attached to the plate.

2. The system of claim 1 wherein the bracket means comprises "L" shaped members.

3. The system of claim 2 wherein the bracket is contained within the pile of the carpet.

4. The system of claim 1 wherein the bracket means are at opposed longitudinal edges and the lateral edge at which the flange is located.

5. The system of claim 1 further including a lifting tool insertable into the aligned notches includes a handle, an elongated, shank, and an inturned end adapted to engage the underside of a cover plate.

6. The system of claim 1, including a series of cover plates laid end-to-end with the notches aligned whereby access can be had to the underside of the covers through the aligned notches.

7. The system of claim 6 further including a lifting tool includes a handle, an elongated, shank, and an inturned end adapted to pass through the opening formed by the aligned notches and engage the underside of one of the cover plates.

8. A utility trench and carpet cover system having both rectangular and round access openings to the trenches in which the carpet covering the trenches is not set out from the remaining carpet and in which the trenches can be accessed through the access openings without damage to the carpet comprising
   a. a floor,
   b. longitudinal utility trenches having an open top formed in the floor and having recessed shoulders adjacent to the top of said trenches,
   c. rectangular trench cover plates positioning on said shoulders to cover the trenches, the cover plates each having a support flange positioned on one lateral edge with a portion of the flange secured to the underside of the plate and a portion extending outwardly from said plate to support the center of the next adjacent plate, a notch in the flange intermediate its ends and a longitudinally aligned notch in the opposite lateral edge of the cover plate whereby when the cover plates are laid end to end the notches coincide,
   d. bracket means around three edges of said cover plate, and
   e. a rectangular carpet segment secured to each of the cover plates within said bracket means, whereby a tool is insertable into said alignment notches for lifting the plate off of the trench without damaging the carpet attached to the plate.

9. The system of claim 8 wherein the carpet segments over the plates have a stiffening backing fastened thereto.

* * * * *